United States Patent [19]
A-Tung

[11] Patent Number: 6,050,760
[45] Date of Patent: Apr. 18, 2000

[54] CNC MILLING MACHINE

[75] Inventor: Teng A-Tung, Taichung Hsien, Taiwan

[73] Assignee: Rambo Machinery Co., Ltd., Taichung, Taiwan

[21] Appl. No.: 09/253,834

[22] Filed: Feb. 19, 1999

[51] Int. Cl.[7] .............................. B23Q 39/02; B23C 1/10
[52] U.S. Cl. ..................... 409/203; 409/213; 409/215; 409/217
[58] Field of Search ................................. 29/39, 26 A, 50, 29/53, 55; 409/203, 213, 215, 217, 144, 190

[56] References Cited

U.S. PATENT DOCUMENTS

| | | | |
|---|---|---|---|
| 2,402,179 | 6/1946 | Nord | 409/203 X |
| 3,096,687 | 7/1963 | Klopp et al. | 409/215 |
| 3,230,837 | 1/1966 | Chiaia | 409/215 |
| 3,735,459 | 5/1973 | Allen | 20/26 A |
| 3,768,364 | 10/1973 | Lancaster et al. | 409/190 |
| 4,378,621 | 4/1983 | Babel | 29/39 X |

FOREIGN PATENT DOCUMENTS 76511  12/1929  Sweden .................................. 409/213

*Primary Examiner*—William Briggs
*Attorney, Agent, or Firm*—W. Wayne Liauh

[57] ABSTRACT

A CNC milling machine comprises a main transmission shaft driven by a motor, an upright shaft provided with a transmission wheel set that is actuated by the main transmission shaft, an engagement device having a main shaft which is provided with a connection member which is in turn provided with an engagement wheel set engaged with the main transmission shaft, and a horizontal shaft provided with a gear set mounted thereon such that the gear set is engageable with the main shaft of the engagement device. The upright shaft is actuated to turn via the transmission wheel set so as to enable an upright milling cutter of the upright shaft to carry out the longitudinal cutting of a workpiece. The horizontal shaft is actuated to turn via the engagement wheel set so as to enable a horizontal milling cutter of the horizontal shaft to carry out the horizontal cutting of the workpiece without having to transfer the workpiece.

9 Claims, 8 Drawing Sheets

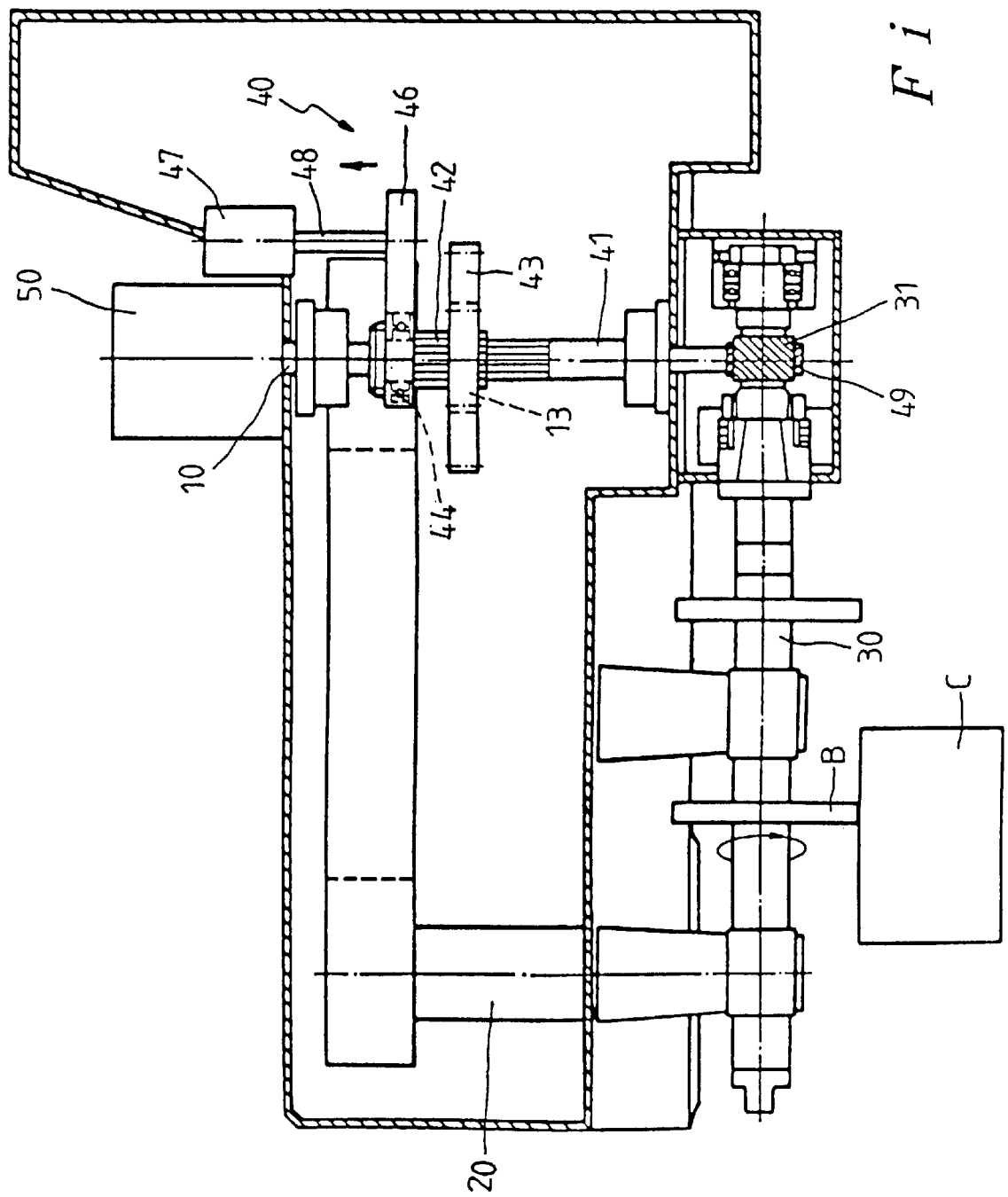

CNC MILLING MACHINE

FIELD OF THE INVENTION

The present invention relates generally to a computer numerical control (CNC) milling machine, and more particularly to an improved CNC milling machine capable of a longitudinal cutting and a horizontal cutting of a workpiece without having to transfer the workpiece to another milling machine.

BACKGROUND OF THE INVENTION

The conventional milling operation calls for the use of an upright milling machine and a horizontal milling machine. The upright milling machine is provided with an upright milling cutter to facilitate the longitudinal cutting of a metal workpiece. Upon completion of the process of the longitudinal cutting of the workpiece, the workpiece is transferred to the horizontal milling machine on which the horizontal cutting of the workpiece is done by a horizontal milling cutter of the horizontal milling machine. It is therefore readily apparent that the conventional milling machines are inefficient and uneconomical.

SUMMARY OF THE INVENTION

It is therefore the primary objective of the present invention to provide an improved CNC milling machine which workpiece and is therefore cost-effective.

In keeping with the principle of the present invention, the foregoing objective of the present invention is attained by an improved CNC milling machine comprising a main transmission shaft, an upright shaft, a horizontal shaft, an engagement device, and a motor. A transmission wheel set is provided between the main transmission shaft and the upright shaft which is provided with an upright milling cutter for carrying out the longitudinal cutting of a workpiece. The engagement device is mounted on the main transmission shaft and is composed of a second gear which is engageable with a first gear of the main transmission shaft. When the second gear is engaged with the first gear, the horizontal shaft is actuated such that a horizontal milling cutter of the horizontal shaft is driven to carry out the horizontal cutting of the workpiece.

The foregoing objective, features, functions, and advantages of the present invention will be more readily understood upon a thoughtful deliberation of the following detailed description of a preferred embodiment of the present invention with reference to the accompanying drawings.

BRIEF DESCRIPTION OF THE DRAWINGS

FIG. 8 shows a schematic view of the horizontal cutting operation carried out by the horizontal milling cutter of the preferred embodiment of the present invention.

DETAILED DESCRIPTION OF THE EMBODIMENT

Figure 1:
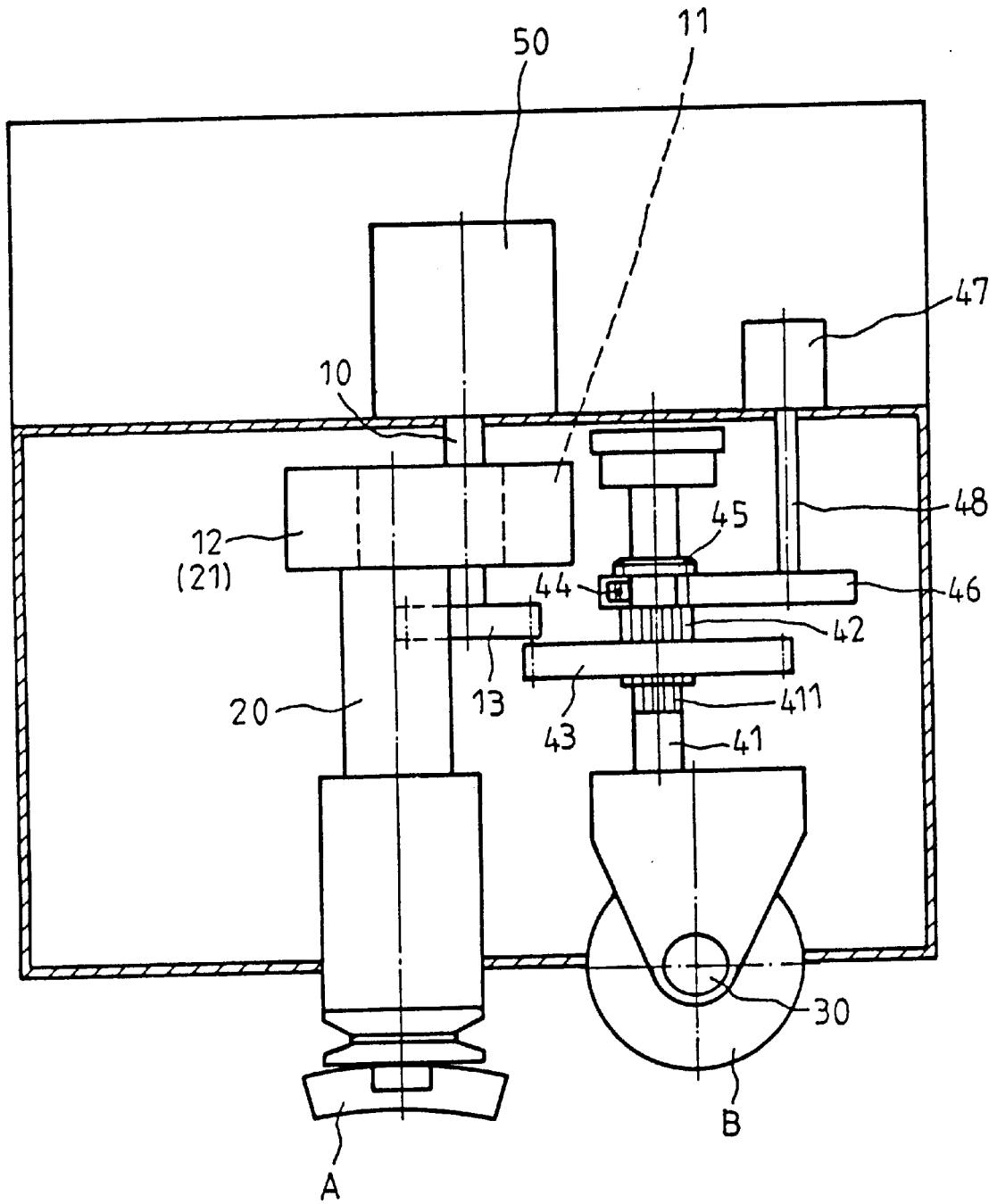
FIG. 1 shows a front view of the preferred embodiment of the present invention.
Figure 2:
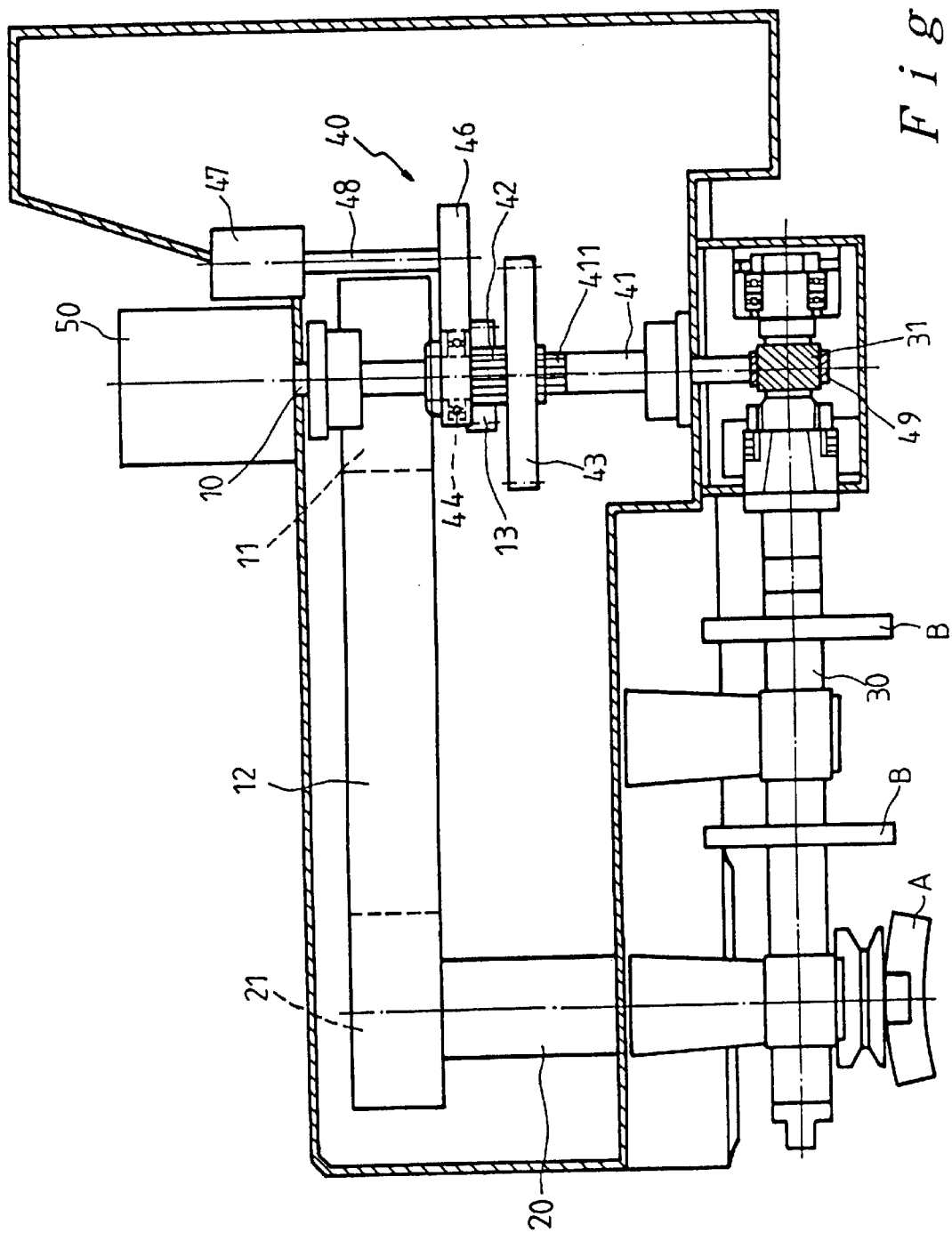
FIG. 2 shows a side view of the preferred embodiment of the present invention.
Figure 3:
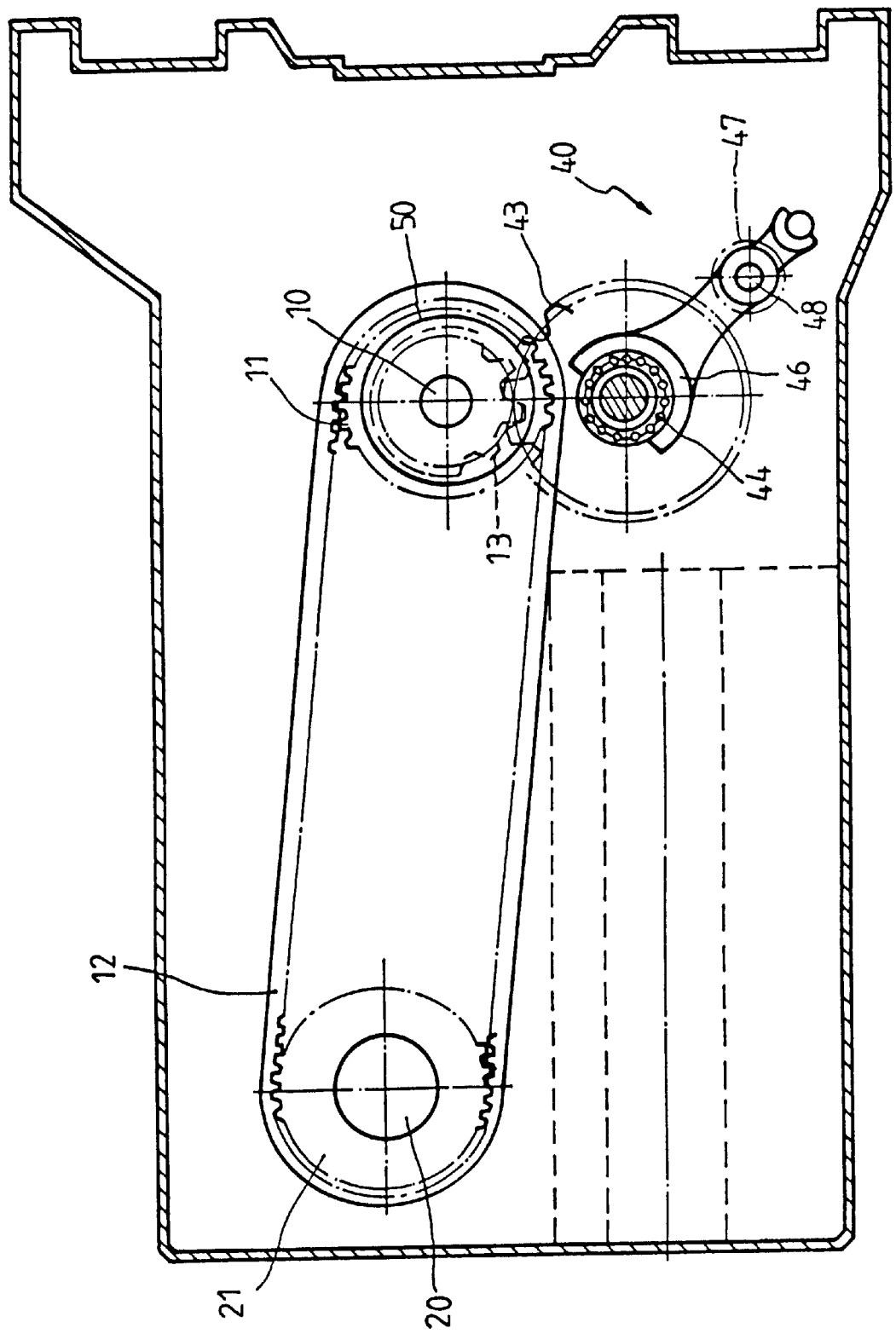
FIG. 3 shows a top view of the preferred embodiment of the present invention.

As shown in FIGS. 1–3, an improved CNC milling machine embodied in the present invention comprises a main transmission shaft 10, an upright shaft 20, a horizontal shaft 30, an engagement device 40, and a motor 50.

Figure 4:
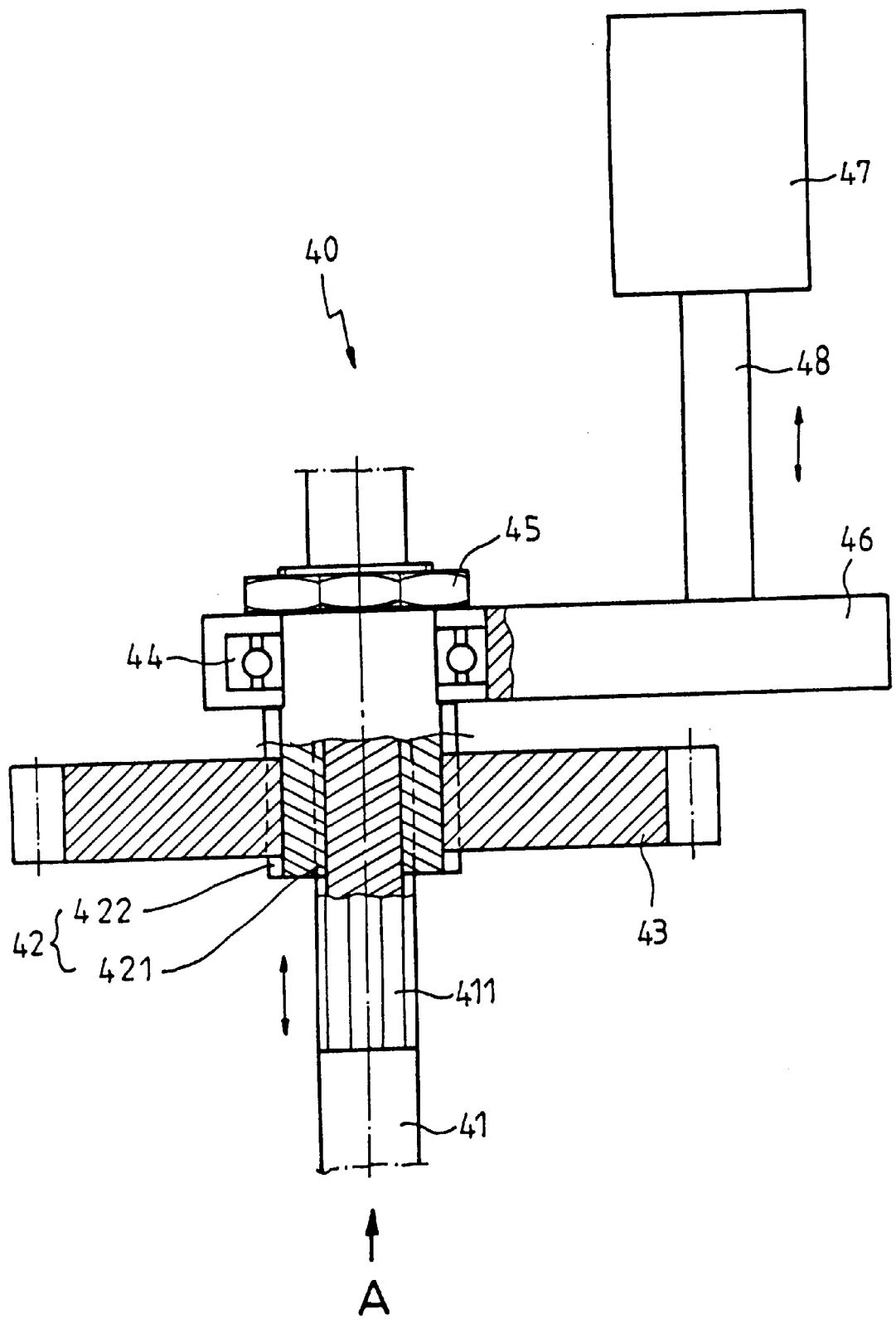
FIG. 4 shows a partial schematic view of the engagement device of the preferred embodiment of the present invention.
Figure 5:
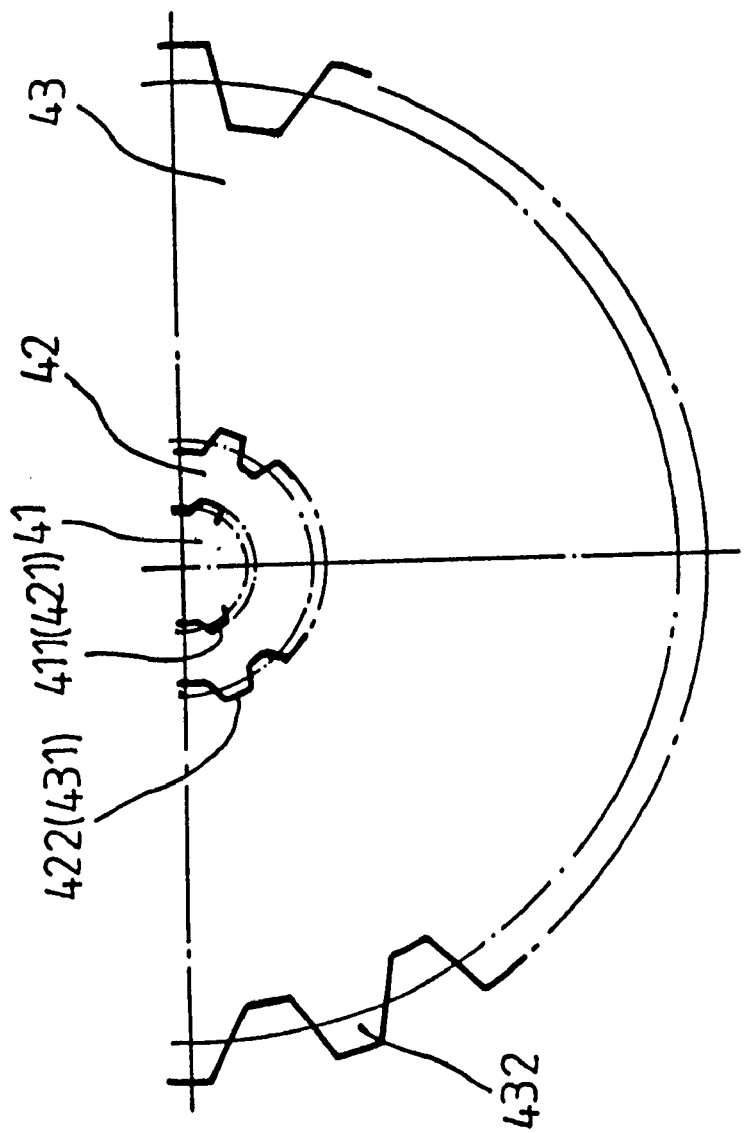
FIG. 5 shows a sectional view taken along the direction indicated by an arrow "A" as shown in FIG. 4.

The main transmission shaft 10 is driven by the motor 50 and is provided with a second belted wheel 11 mounted on the shaft thereof and linked with a first belted wheel 21 mounted on shaft thereof and linked with a first belted wheel 21 mounted on the upright shaft 20. The second belted wheel 11 is linked with the first belted wheel 21 by a timing belt 12 such that the first belted wheel 21 and the second belted wheel 11 form together a transmission wheel set. An upright milling cutter "A" is mounted on the free end of the upright shaft 20. Now referring to FIGS. 4 and 5, the engagement device 40 is composed of a main shaft 41 which is provided in the upper segment thereof with an outer toothed segment 411 for engaging a connection member 42 having inner teeth 421 and outer teeth 422. The inner teeth 421 of the connection member 42 are capable of cooperating with the outer toothed segment 411 of the main shaft 41, thereby enabling the connection member 42 to slide and rotate on the main shaft 41. The outer teeth 422 of the connection member 42 is provided with a first gear 43 having inner teeth 431 and outer teeth 432. The inner teeth 431 cooperate with the outer teeth 422 of the connection member 42. The outer teeth 432 of the first gear 43 are engaged with a second gear 13 mounted on the main transmission shaft 10. The connection member 42 is further provided with a locating member 44, which is a bearing, mounted securely on the connection member 42 by a nut 45 such that the locating member 44 is connected with a connection rod 46 which is provided at one end thereof with a clamping device 461. The connection rod 46 is connected at other end thereof with a drive source, which is a pressure cylinder 47. The pressure cylinder 47 is coupled with the connection rod 46 by a piston rod 48 and is intended to actuate the connection member 42 to ascend and descend. The horizontal shaft 30 is provided with a second bevel gear 31 which is engaged with a first bevel gear 49 mounted on the lower segment of the main shaft 41. The first bevel gear 49 and the second bevel gear 31 are engaged with each other in a cruciform manner so as to form a transmission gear set. The transmission gear set is provided with a horizontal milling cutter "B" fastened therewith.

Figure 6:
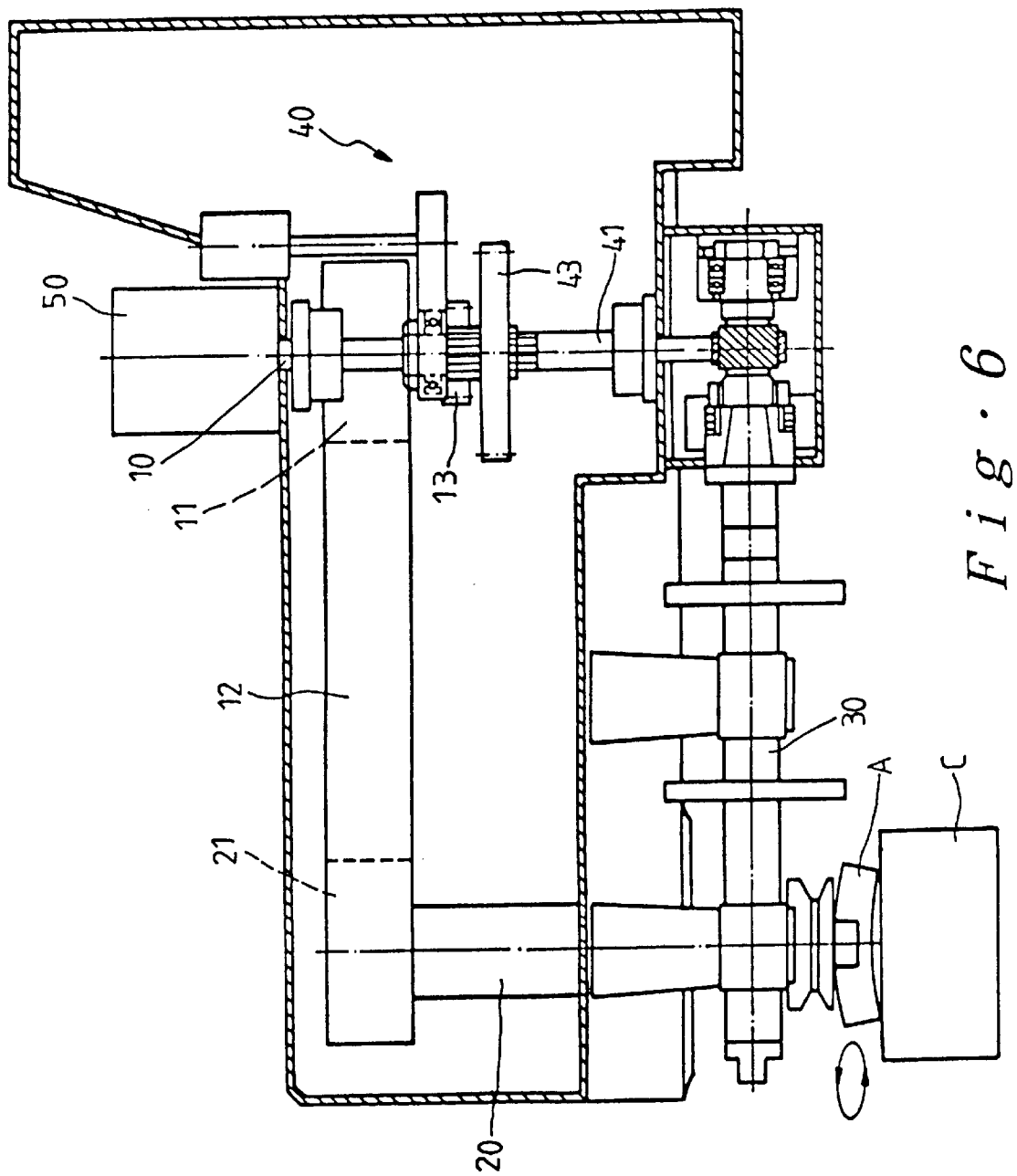
FIG. 6 shows a schematic view of the longitudinal cutting operation carried out by the upright milling cutter of the preferred embodiment of the present invention.

As shown in FIG. 6, when the first gear 43 of the engagement device 40 is in a normal operating state, the first gear 43 has a potential head relative to the second gear 13 of the main transmission shaft 10. As the main transmission shaft 10 is driven by the motor 50 to turn, the first belted wheel 21 of the upright shaft 20 is actuated by the second belted wheel 11 of the main transmission shaft 10 to turn via the timing belt 12. As a result, the upright shaft 20 is driven to rotate. In the meantime, the horizontal shaft 30 is not driven to turn in view of the fact that the first gear 43 of the engagement device 40 is not yet engaged with the second gear 13 of the main transmission shaft 10. For this reason, only the longitudinal cutting of a workpiece "C" is done by the upright milling cutter "A".

Figure 7:
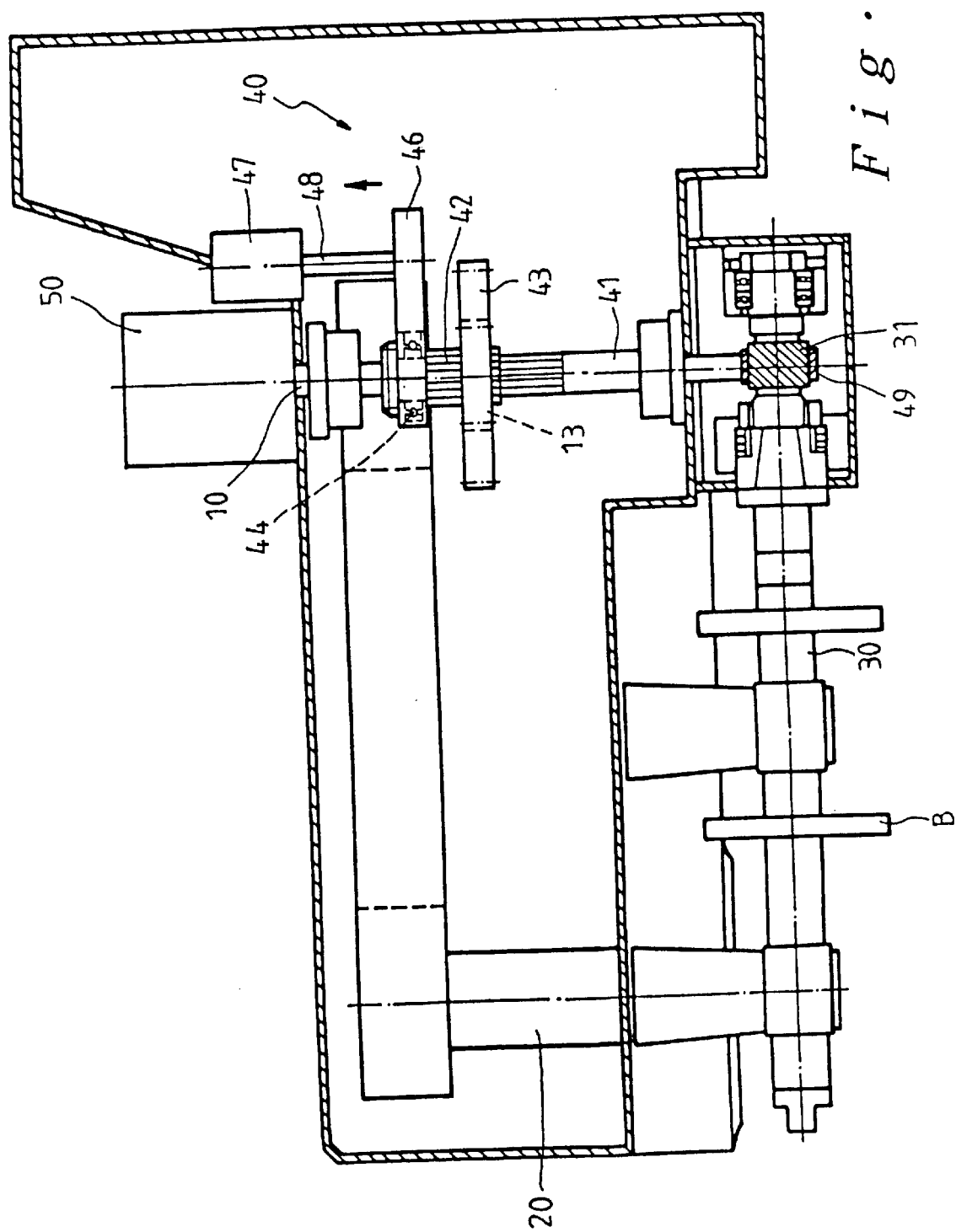
FIG. 7 shows a schematic view of the engaging action of the engagement device of the preferred embodiment of the present invention.

Upon completion of the longitudinal cutting of the workpiece "C" by the upright milling cutter "A", the horizontal milling cutter "B" without transferring the workpiece "C", as shown in FIGS. 7 and 8. Before the horizontal cutting of the workpiece "C" is carried out, the upright milling cutter "A" is detached. The drive source of the engagement device 40 is started such that the connection rod 46 is actuated by the piston rod 48 of the pressure cylinder 47 (drive source) to rise, thereby actuating the locating member 44 and the connection member 42 to rise such that the first gear 43 of the connection member 42 is engaged with the second gear 13 of the main transmission shaft 10, so as to actuate the gear set mounted on other end of the main shaft 41. As the main transmission shaft 10 and the upright shaft 20 are driven by the motor 50 to turn, the gear set (formed by the first bevel gear 49 and the second bevel gear 31) is actuated by the engagement wheel set (formed by the first gear 43 and the second gear 13). As a result, the horizontal shaft 30 is actuated to turn to drive the horizontal milling cutter "B" to carry out the horizontal cutting of the workpiece "C". It is therefore readily apparent that the CNC milling machine of the present invention is relatively efficient and cost-effective.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A CNC milling machine comprising:
    a motor;
    a main transmission shaft driven by said motor;
    an upright shaft provided with a transmission wheel adopted to be actuated by said main transmission shaft;
    an engagement device having a main shaft which is provided with a connection member, said connection member being provided with an engagement wheel set which is engaged with said main transmission shaft, said connection member further being connected with a connection rod which is coupled with a drive source for actuating said connection member to ascend or descend; and
    a horizontal shaft provided at one end thereof with a gear set mounted thereon such that said gear set is engageable with said main shaft of said engagement device;
    said upright shaft being actuated to turn via said transmission wheel set at such time when said main transmission shaft is driven by said motor to rotate, thereby causing an upright cutter to carry out a longitudinal cutting of a workpiece, said horizontal shaft being actuated to turn via said engagement wheel set and said gear set at such time when said main transmission shaft is driven by said motor to rotate, thereby causing a horizontal cutter to carry out a horizontal cutting of the workpiece without transferring the workpiece;
    wherein said transmission wheel set comprises a first belted wheel mounted on said upright shaft, and a second belted wheel mounted on said main transmission shaft such that said second belted wheel is linked with said first belted wheel by a transmission belt.

2. The milling machine as defined in claim 1, wherein said transmission belt is a timing belt.

3. The milling machine as defined in claim 1, wherein said upright shaft is provided at one end thereof with an upright milling cutter fastened therewith for carrying out the longitudinal cutting of the workpiece.

4. A CNC milling machine comprising:
    a motor;
    a main transmission shaft driven by said motor;
    an upright shaft provided with a transmission wheel adopted to be actuated by said main transmission shaft;
    an engagement device having a main shaft which is provided with a connection member, said connection member being provided with an engagement wheel set which is engaged with said main transmission shaft, said connection member further being connected with a connection rod which is coupled with a drive source for actuating said connection member to ascend or descend; and
    a horizontal shaft provided at one end thereof with a gear set mounted thereon such that said gear set is engageable with said main shaft of said engagement device;
    said upright shaft being actuated to turn via said transmission wheel set at such time when said main transmission shaft is driven by said motor to rotate thereby causing an upright cutter to carry out a longitudinal cutting of a workpiece, said horizontal shaft being actuated to turn via said engagement wheel set and said gear set at such time when said main transmission shaft is driven by said motor to rotate, thereby causing a horizontal cutter to carry out a horizontal cutting of the workpiece without transferring the workpiece;
    wherein said connection member has inner teeth and outer teeth, with said inner teeth being engaged with an outer toothed segment of said main shaft, and with said outer teeth being engaged with inner teeth of a first gear.

5. The milling machine as defined in claim 1, wherein said horizontal shaft is provided at one end thereof with a horizontal milling cutter fastened therewith for carrying out the horizontal cutting of the workpiece.

6. A CNC milling machine comprising:
    a motor,
    a main transmission shaft driven by said motor;
    an upright shaft provided with a transmission wheel adopted to be actuated by said main transmission shaft;
    an engagement device having a main shaft which is provided with a connection member, said connection member being provided with an engagement wheel set which is engaged with said main transmission shaft, said connection member further being connected with a connection rod which is coupled with a drive source for actuating said connection member to ascend or descend; and
    a horizontal shaft provided at one end thereof with a gear set mounted thereon such that said gear set is engageable with said main shaft of said engagement device;
    said upright shaft being actuated to turn via said transmission wheel set at such time when said main transmission shaft is driven by said motor to rotate, thereby causing an upright cutter to carry out a longitudinal cutting of a workpiece, said horizontal shaft being actuated to turn via said engagement wheel set and said gear set at such time when said main transmission shaft is driven by said motor to rotate, thereby causing a horizontal cutter to carry out a horizontal cutting of the workpiece without transferring the workpiece;
    wherein said connection member is provided with a locating member fastened therewith by a nut such that said locating member is coupled with a connection rod which is in turn coupled with a clamping device and said locating member is a bearing.

7. The milling machine as defined in claim 1, wherein said engagement wheel set is composed of a first gear and a second gear mounted on said main transmission shaft.

8. A CNC milling machine comprising:

a motor;

a main transmission shaft driven by said motor;

an upright shaft provided with a transmission wheel adopted to be actuated by said main transmission shaft;

an engagement device having a main shaft which is provided with a connection member, said connection member being provided with an engagement wheel set which is engaged with said main transmission shaft, said connection member further being connected with a connection rod which is coupled with a drive source for actuating said connection member to ascend or descend; and a horizontal shaft provided at one end thereof with a gear set mounted thereon such that said gear set is engageable with said main shaft of said engagement device;

said upright shaft being actuated to turn via said transmission wheel set at such time when said main transmission shaft is driven by said motor to rotate, thereby causing an upright cutter to carry out a longitudinal cutting of a workpiece, said horizontal shaft being actuated to turn via said engagement wheel set and said gear set at such time when said main transmission shaft is driven by said motor to rotate, thereby causing a horizontal cutter to carry out a horizontal cutting of the workpiece without transferring the workpiece;

wherein said drive source of said engagement device is a pressure cylinder having a piston rod which is connected with said connection rod.

9. The milling machine as defined in claim 1, wherein said gear set is composed of a first bevel gear mounted on said main shaft of said engagement device, and of a second bevel gear mounted on said horizontal shaft and engaged with said first bevel gear.

\* \* \* \* \*